US011893952B2

(12) United States Patent
Duan et al.

(10) Patent No.: US 11,893,952 B2
(45) Date of Patent: Feb. 6, 2024

(54) SIMPLIFYING SUBSTRATE FOR DISPLAY PANEL WITH WAVEGUIDE DISPLAY REGION AND DRIVING OF TWO DISPLAY REGIONS BY ONE DRIVING SYSTEM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Liye Duan, Beijing (CN); Zongmin Liu, Beijing (CN); Long Wang, Beijing (CN); Mengjun Hou, Beijing (CN); Yao Lu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/264,325

(22) PCT Filed: May 28, 2020

(86) PCT No.: PCT/CN2020/092786

§ 371 (c)(1),
(2) Date: Jan. 29, 2021

(87) PCT Pub. No.: WO2020/238999

PCT Pub. Date: Dec. 3, 2020

(65) Prior Publication Data

US 2021/0295797 A1 Sep. 23, 2021

(30) Foreign Application Priority Data

May 29, 2019 (CN) ........................ 201910454616.9

(51) Int. Cl.
*G09G 3/36* (2006.01)
*G09G 3/3266* (2016.01)
*G09G 3/3275* (2016.01)

(52) U.S. Cl.
CPC ......... *G09G 3/3688* (2013.01); *G09G 3/3266* (2013.01); *G09G 3/3275* (2013.01);
(Continued)

(58) Field of Classification Search
CPC ...... G09G 3/36; G09G 3/3607; G09G 3/3611; G09G 3/3614; G09G 3/3622;
(Continued)

(56) References Cited

U.S. PATENT DOCUMENTS 6,873,319 B2 3/2005 Inoue et al.
10,417,954 B2 9/2019 Yang et al.
(Continued)

FOREIGN PATENT DOCUMENTS

CN 1363080 A 8/2002
CN 1363921 A 8/2002
(Continued)

OTHER PUBLICATIONS

First office action issued in Chinese Patent Application No. 201910454616.9 with search report.

*Primary Examiner* — Ke Xiao
*Assistant Examiner* — Nelson Lam
(74) *Attorney, Agent, or Firm* — Chiwin Law LLC

(57) ABSTRACT

A display panel and a driving method thereof, and a display device are provided. The display panel includes a first display region, a second display region, and a control device. The first display region is on a side of the second display region, and the second display region includes N display sub-regions; and the control device is connected to the first display region and the second display region, respectively,
(Continued)

and configured to control display of the first display region and display of the second display region in i time intervals within one frame period, and sequentially control the display of the first display region and display of an i-th display sub-region in the second display region in an i-th time interval, wherein 1≤i≤N, and N is a positive integer greater than or equal to 3.

15 Claims, 3 Drawing Sheets

(52) U.S. Cl.
CPC ... *G09G 3/3677* (2013.01); *G09G 2300/0439* (2013.01); *G09G 2310/0278* (2013.01)

(58) Field of Classification Search
CPC .... G09G 3/3625; G09G 3/364; G09G 3/3644; G09G 3/3648; G09G 3/3666; G09G 3/3677; G09G 3/3681; G09G 3/3688; G09G 3/3692; G09G 3/30; G09G 3/32; G09G 3/308; G09G 3/3216; G09G 3/3225; G09G 3/3233; G09G 3/3258; G09G 3/3266; G09G 3/3275; G09G 3/3283; G09G 3/3208
USPC ........................................ 345/76–83, 87–104
See application file for complete search history.

(56) References Cited

U.S. PATENT DOCUMENTS

2003/0043097 A1* 3/2003 Shingai ................ G09G 3/3666 345/87
2003/0080932 A1* 5/2003 Konno ................. G09G 3/3648 345/96
2006/0022931 A1* 2/2006 Yoshimoto ........... G09G 3/3677 345/98
2006/0050047 A1* 3/2006 Jin ......................... G09G 3/342 345/102
2006/0139289 A1* 6/2006 Yoshida ................. G09G 3/342 345/98
2007/0109254 A1* 5/2007 Kang ................... G09G 3/3666 345/103
2009/0278778 A1* 11/2009 Tanaka ................. G09G 3/3655 345/94
2010/0188439 A1* 7/2010 Sugimoto ............. G09G 3/342 345/102
2010/0302135 A1 12/2010 Larson et al.
2010/0309108 A1* 12/2010 Ooishi ................. G09G 3/3666 345/100
2012/0050240 A1* 3/2012 Tanaka ................. G09G 3/3666 345/204
2014/0085279 A1* 3/2014 Shiomi ................ G09G 3/3666 345/204
2016/0148585 A1* 5/2016 Yatabe ................. G09G 3/3666 345/96
2016/0171944 A1* 6/2016 Namkung ............ G09G 3/3614 345/96
2017/0221411 A1* 8/2017 Chang .................. G11C 19/287
2019/0064601 A1 2/2019 Wei
2021/0193067 A1* 6/2021 Shao .................... G09G 3/3685

FOREIGN PATENT DOCUMENTS

CN 103309549 A 9/2013
CN 105867867 A 8/2016
CN 106710562 A 5/2017
CN 107479253 A 12/2017
CN 207818088 U 9/2018
CN 108831369 A 11/2018
CN 109541849 A 3/2019
CN 110111734 A 8/2019
EP 0788014 A3 9/1998
EP 2270581 A1 1/2011
WO 2018143028 A1 8/2018

* cited by examiner

SIMPLIFYING SUBSTRATE FOR DISPLAY PANEL WITH WAVEGUIDE DISPLAY REGION AND DRIVING OF TWO DISPLAY REGIONS BY ONE DRIVING SYSTEM

This application is a U.S. National Phase Entry of International Application No. PCT/CN2020/092786 filed on May 28, 2020, designating the United States of America and claiming priority to Chinese Patent Application No. 201910454616.9, filed on May 29, 2019. The present application claims priority to and the benefit of the above-identified applications and the above-identified applications are incorporated by reference herein in their entirety.

TECHNICAL FIELD

Embodiments of the present disclosure relate to a display panel and a driving method thereof, and a display device.

BACKGROUND

Waveguide display technology is a new type of display technology which may provide higher transmittance. Based on the characteristics of high transmittance and due to the pursuit of full display screens by terminal mobile phone manufacturers and users in recent years, people have been considering combining a waveguide display screen with an ordinary liquid crystal display (LCD) screen or organic light-emitting diode (OLED) display screen together. Various front optical sensors may be provided under the waveguide display screen. In this way, during normal display, the waveguide display screen and the ordinary LCD screen or OLED display screen provide display content together. When the mobile phone is used for self-photographing or other front optical sensors need to be used, the waveguide display screen may provide transparent display, so that the front camera or other front optical sensors under the waveguide display screen may work normally.

In the traditional two-screen integrated display solution, the two-screen independent driving mode is generally adopted, but the simultaneous existence of two driving systems may make the structure complicated and redundant.

SUMMARY

Embodiments of the disclosure provide a display panel and a driving method thereof, and a display device, which can simplify the substrate structure and realize the effect of driving two display regions by one driving system.

In one aspect, an embodiment of the disclosure provides a display panel, comprising a first display region, a second display region, and a control device, wherein the first display region is on a side of the second display region, and the second display region comprises N display sub-regions; and the control device is connected to the first display region and the second display region, respectively, and configured to control display of the first display region and display of the second display region in i time intervals within one frame period, and sequentially control the display of the first display region and display of an i-th display sub-region in the second display region in an i-th time interval, wherein 1≤i≤N, and N is a positive integer greater than or equal to 3.

In another aspect, an embodiment of the disclosure provides a display device, comprising a display panel, wherein the display panel comprises a first display region, a second display region, and a control device; the first display region is on a side of the second display region, and the second display region comprises N display sub-regions; and the control device is connected to the first display region and the second display region, respectively, and is configured to control display of the first display region and display of the second display region in i time intervals within one frame period and sequentially control the display of the first display region and display of an i-th display sub-region in the second display region in an i-th time interval, wherein 1≤i≤N, and N is a positive integer greater than or equal to 3.

In still another aspect, an embodiment of the disclosure provides a driving method of a display panel, wherein the display panel comprises a first display region, a second display region, and a control device; the first display region is on a side of the second display region, the second display region comprises N display sub-regions, the control device is connected to the first display region and the second display region, respectively, and N is a positive integer greater than or equal to 3, the driving method comprises: controlling display of the first display region and display of the second display region in i time intervals within one frame period, respectively, and sequentially controlling the display of the first display region and display of an i-th display sub-region in the second display region in an i-th time interval, wherein 1≤i≤N.

BRIEF DESCRIPTION OF THE DRAWINGS

In order to clearly illustrate the technical solution of the embodiments of the invention or the related techniques, the drawings used for describing the embodiments or the related techniques will be briefly described in the following; it is obvious that the described drawings are only related to some embodiments of the invention. For those skilled in the art, other drawings can be obtained according to these drawings without creative labor. In the drawings.

DETAILED DESCRIPTION

Figure 1:
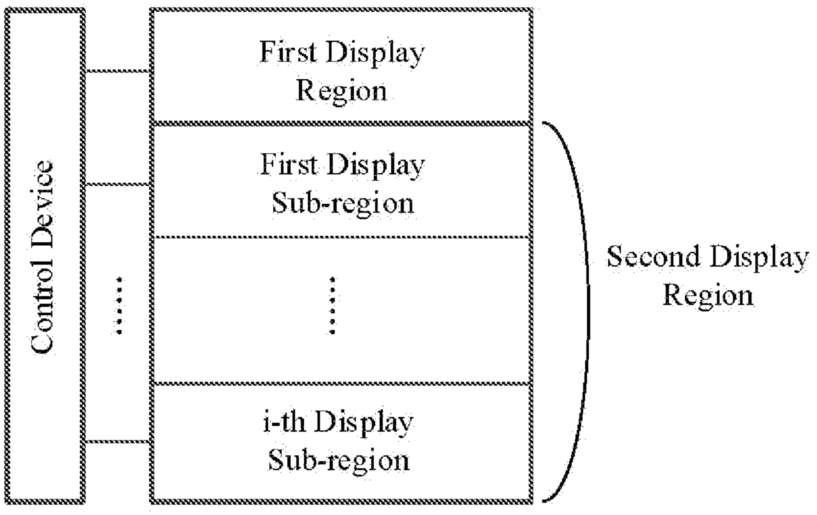
FIG. 1 is a schematic diagram of a display panel provided by an embodiment of the present disclosure.

The present disclosure describes a number of embodiments, but the description is exemplary and not restrictive, and it is obvious to those skilled in the art that there are more examples and implementation schemes within the scope included in the embodiments described in the present disclosure. Although many possible combinations of features are shown in the drawings and discussed in the specific embodiments, many other combinations of the disclosed features are also possible. Unless specifically limited, any feature or element of any embodiment can be used in combination with any other feature or element in any other embodiment, or can replace any other feature or element in any other embodiment.

The present disclosure includes and contemplates combinations with features and elements known to those skilled in the art. The embodiments, features, and elements already disclosed in the present disclosure can also be combined with any conventional features or elements to form a unique invention solution defined by the claims. Any feature or element of any embodiment can also be combined with features or elements from other invention solutions to form another unique invention solution defined by the claims. Therefore, it should be understood that any feature shown and/or discussed in this disclosure can be implemented individually or in any suitable combination. Therefore, the embodiments are not restricted except for the restrictions made according to the appended claims and their equivalents. In addition, various modifications and changes can be made within the protection scope of the appended claims.

In addition, when describing representative embodiments, the specification may have presented the method and/or process as a specific sequence of steps. However, to the extent that the method or process does not depend on the specific order of the steps described herein, the method or process should not be limited to the steps in the specific order described. As those of ordinary skill in the art will understand, other sequence of steps are also possible. Therefore, the specific order of steps set forth in the specification should not be construed as a limitation on the claims. In addition, the claims for the method and/or process should not be limited to performing their steps in the written order. Those skilled in the art can easily understand that these orders can be changed and still remain within the spirit and scope of the embodiments of the present application.

As illustrated in FIG. 1, an embodiment of the present disclosure provides a display panel including a first display region, a second display region, and a control device. The first display region is arranged on a side of the second display region, and the second display region includes N display sub-regions; the control device is connected to the first display region and the second display region, respectively, and is configured to control display of the first display region and display of the second display region in i time intervals within one frame period and sequentially control the display of the first display region and display of an i-th display sub-region in an i-th time interval; and $1 \le i \le N$, and N is a positive integer greater than or equal to 3.

The embodiment of the present disclosure provides a display panel which drives the display of the first display region and the display of the second display region in a time-sharing manner through the control device, so as to simplify the substrate structure and realize the effect of driving two display regions by one driving system.

In an exemplary embodiment, the first display region includes a plurality of first pixel units, and the first pixel units are defined by intersection of X1 horizontally arranged first gate lines and Y vertically arranged data lines. The second display region includes a plurality of second pixel units, and the second pixel units are defined by intersection of X2 horizontally arranged second gate lines and Y vertically arranged data lines. The first display region is on a side of the second display region along an extending direction of data lines, and the N display sub-regions in the second display region are sequentially arranged along the extending direction of the data lines. X1, X2 and Y are all positive integers.

In the exemplary embodiment, the first display region and the second display region share the Y data lines, that is, the two display regions use the same data lines.

With the above layout, the first pixel units in the first display region and the second pixel units in the second display region share the Y data lines, so that a set of control devices may control the display of the first display region and the display of the second display region in a time-sharing manner.

Figure 2:
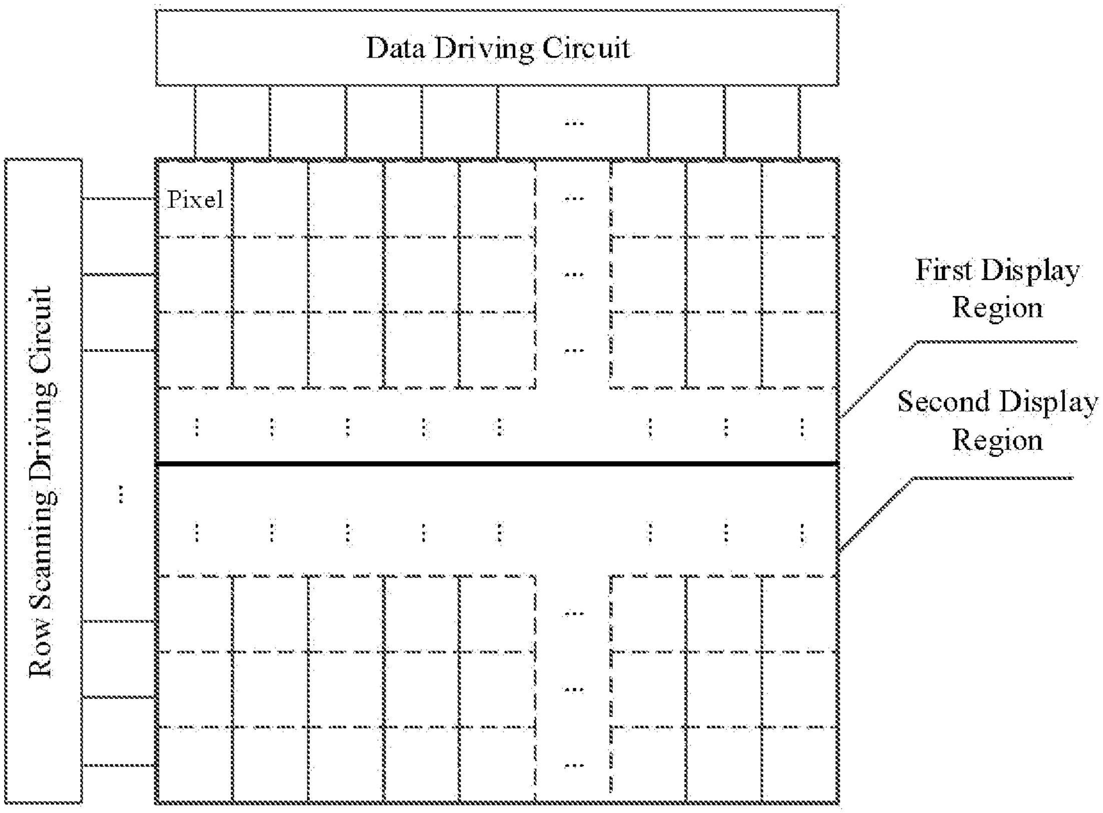
FIG. 2 is a schematic diagram of a control device in a display panel provided by an embodiment of the present disclosure, which includes a data driving circuit and a row scanning driving circuit.

In an exemplary embodiment, the control device may include a row scanning driving circuit and a data driving circuit, the row scanning driving circuit is connected to the X1 first gate lines and X2 second gate lines, and the data driving circuit is connected to the Y data lines. As illustrated in FIG. 2, the plurality of gate lines from the row scanning driving circuit and the plurality of data lines from the data driving circuit are formed on the display panel in an intersecting manner, and the plurality of pixel units (pixels) are formed at the intersections. Each pixel unit may include three sub-pixels for displaying R (red), G (green), and B (blue), or may include four sub-pixels for displaying R, G, B, and W (white), and the embodiments of the present disclosure are not limited in this aspect.

In the exemplary embodiment, for the thin film transistor provided at each pixel unit of the display panel, the gate electrode is connected to the gate line, the source electrode is connected to the data line, and the drain electrode is connected to the pixel electrode. For the material constituting the active layer of the thin film transistor, amorphous silicon (a-Si silicon), polysilicon, or the like may be used, and oxides with enhanced mobility characteristics may also be used in the case where high-performance elements are required due to the trend of large size and high image quality.

In an exemplary embodiment, the control device is configured to sequentially control the display of the first display region and the display of the i-th display sub-region in the second display region in the i-th time interval, which for example, may include:

in the first sub-interval of the i-th time interval within one frame period, the row scanning driving circuit sequentially sends scanning signals to gate lines of the first display region, and the data driving circuit outputs data signals to the data lines;

in the second sub-interval of the i-th time interval within one frame period, the row scanning driving circuit sequentially sends scanning signals to gate lines of the i-th display sub-region, and the data driving circuit outputs data signals to the data lines.

In an exemplary embodiment, the first display region includes a plurality of first pixel units, and each first pixel unit includes sub-pixel units of N colors. The second display region includes a plurality of second pixel units, and each second pixel unit includes sub-pixel units of N colors. The control device sequentially controls the display of the first display region and the display of the i-th display sub-region in the i-th time interval, which for example, may include:

in the first sub-interval of the i-th time interval within one frame period, scanning signals for driving the i-th color of the first pixel units are sent, and the data driving circuit outputs data signals of the i-th color of the first pixel units to the data lines;

in the second sub-interval of the i-th time interval within one frame period, the row scanning driving circuit sequentially sends scanning signals for driving the N colors of second pixel units in the i-th display sub-region to the gate lines of the i-th display sub-region, and the data driving circuit outputs data signals of N colors of the second pixel units to the data lines.

In an exemplary embodiment, the row scanning driving circuit may include N+1 row scanning driving sub-circuits, one of N+1 row scanning driving sub-circuits is connected to the X1 first gate lines in the first display region, and each remaining row scanning driving sub-circuit is connected to the second gate line in one display sub-region in the second display region, that is, each of the remaining row scanning driving sub-circuits is used to drive one display sub-region in the second display region.

In the embodiments of the present disclosure, the manner in which each row scanning driving sub-circuit controls one display region (or one display sub-region) is simpler in implementation. For example, when a display region (or a display sub-region) needs to be displayed, it is only necessary to provide a start signal to the corresponding row scanning driving sub-circuit.

In an exemplary embodiment, the first display region is a waveguide display region, the first display region further includes N light sources, and the light sources are arranged at least on one side of the first display region. The second display region is a liquid crystal display region or an organic light-emitting diode (OLED) display region. The data driving circuit includes a data driver and a light source driver, the data driver is connected to the Y data lines for sending data signals, and the light source driver is connected to the N light sources for sending light source turn-on signals.

In an exemplary embodiment, the waveguide display region may include a cell-assembled array substrate and a cover plate, fillers located between the array substrate and the cover plate, and light sources arranged on the side of the array substrate and the side of the cover plate. The filler may include liquid crystal and polymer. The refractive index of the liquid crystal when no voltage is applied is different from the refractive index when a voltage is applied, and the refractive index of the liquid crystal when no voltage is applied is the same as the refractive index of the polymer (greater than the refractive index of glass). The image display of the display region is controlled by applying the voltage to the liquid crystal. When no voltage is applied to the liquid crystal, the incident light may pass through the liquid crystal and the polymer before arriving at the cover plate. Because the refractive index of the liquid crystal and the refractive index of the polymer are identical and both greater than the refractive index of glass, the direction of the incident light passing through the liquid crystal and the polymer may not change. When the incident light reaches the cover plate, since the incident light meets the condition of total reflection, total reflection may occur on the cover plate, so that this part of the area does not emit light. When a voltage is applied to the liquid crystal, the refractive index of the liquid crystal in this part of the area changes. When the incident light passes through the liquid crystal and reaches the polymer, since the refractive index of the liquid crystal is different from the refractive index of the polymer, the incident light may be refracted on the polymer and finally refracted to the cover plate, so that the incident angle of part of the incident light reaching the cover plate is not greater than the critical angle corresponding to the filler and the cover plate, that is, the incident light reaching the cover plate does not meet the condition of total reflection, total reflection cannot occur on the cover plate, and the incident light may be emitted from the cover plate, so that this part of the area emits light.

It can be seen that the rotation of the liquid crystal can be controlled by controlling the voltage applied to both ends of the liquid crystal, that is, the refractive index of the liquid crystal is controlled to perform gray scale control, and the image display can be realized by the light source provided on one side of the display region. The light source in the waveguide display region includes but is not limited to: a red light source, a green light source, and a blue light source.

In an exemplary embodiment, in the i-th time interval, sequentially controlling the display of the first display region and the display of the i-th display sub-region includes:

- in the first sub-interval of the i-th time interval within one frame period, sequentially sending scanning signals to the X1 first gate lines of the waveguide display region through the row scanning driving circuit, and outputting data signals to the Y data lines through the data driver;
- in the second sub-interval of the i-th time interval within one frame period, sequentially sending scanning signals to the second gate lines of the i-th display sub-region through the row scanning driving circuit, outputting data signals to the Y data lines through the data driver, and outputting a light source turn-on signal to an i-th light source through the light source driver.

In the waveguide display region (the first display region), the rotation of the liquid crystal may be controlled by the scanning signal of the first gate line and the data signal of the data line, so as to cooperate with the light source turn-on signal to achieve image display. In the LCD region or OLED display region (the second display region), image display is realized by the scanning signal of the second gate line and the data signal of the data line.

Hereinafter, the transparent display region as the waveguide display and the non-transparent display region as the LCD display are taken as an example for schematic description of the above-mentioned display panel and the driving method thereof. In this example, N=3.

Figure 3:
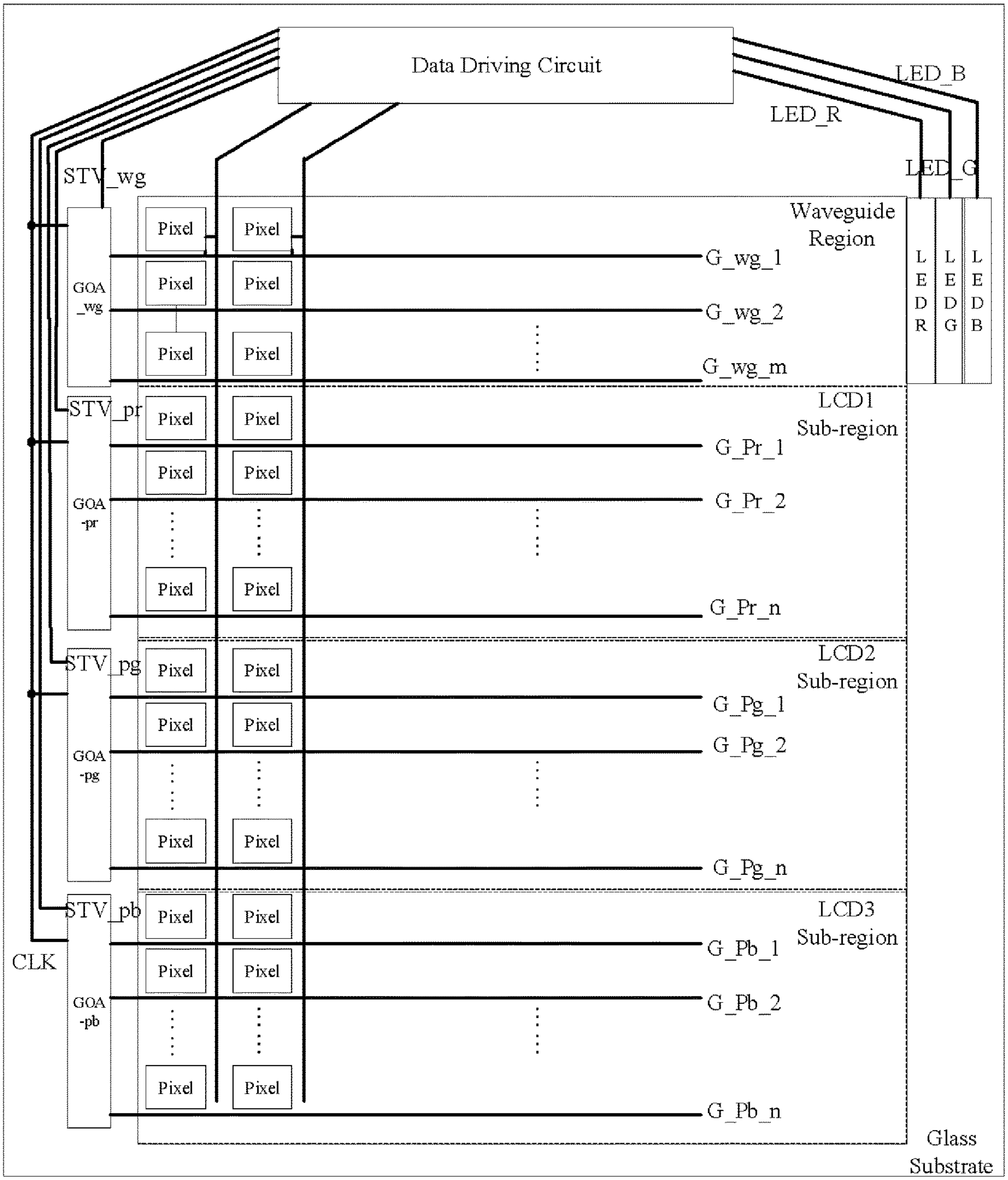
FIG. 3 is a schematic structural diagram of a display panel provided by an embodiment of the present disclosure.

As illustrated in FIG. 3, the waveguide display region and the ordinary liquid crystal display region are manufactured on the same glass substrate. The waveguide display region and the ordinary liquid crystal display region are driven by the same column driver. The column driver is the aforementioned data driving circuit, and each column of data lines is connected to the pixels in the waveguide display region and the ordinary liquid crystal display region in the same column. The row driver is the aforementioned row scanning driving circuit. In this example, the row driver includes 4 GOA (Gate driver on Array). The row selection line (i.e., the gate line) in the waveguide display region and the ordinary liquid crystal display region may be activated based on timing requirements according to the needs of the system. When the row selection line in the waveguide display region and the ordinary liquid crystal display region is at a high (or low) level, the analog voltage of the data line is written into the pixel of the corresponding row. The LED control of the waveguide display region is also schematically shown in FIG. 3. As illustrated in FIG. 3, different from the ordinary liquid crystal display region, the LEDs in the waveguide display region are not continuously activated, and the lighting time is controlled by the system. For example, in this example, the lighting of the LED in the waveguide display region and the data refresh of the liquid crystal display region are at the same time.

Figure 4:
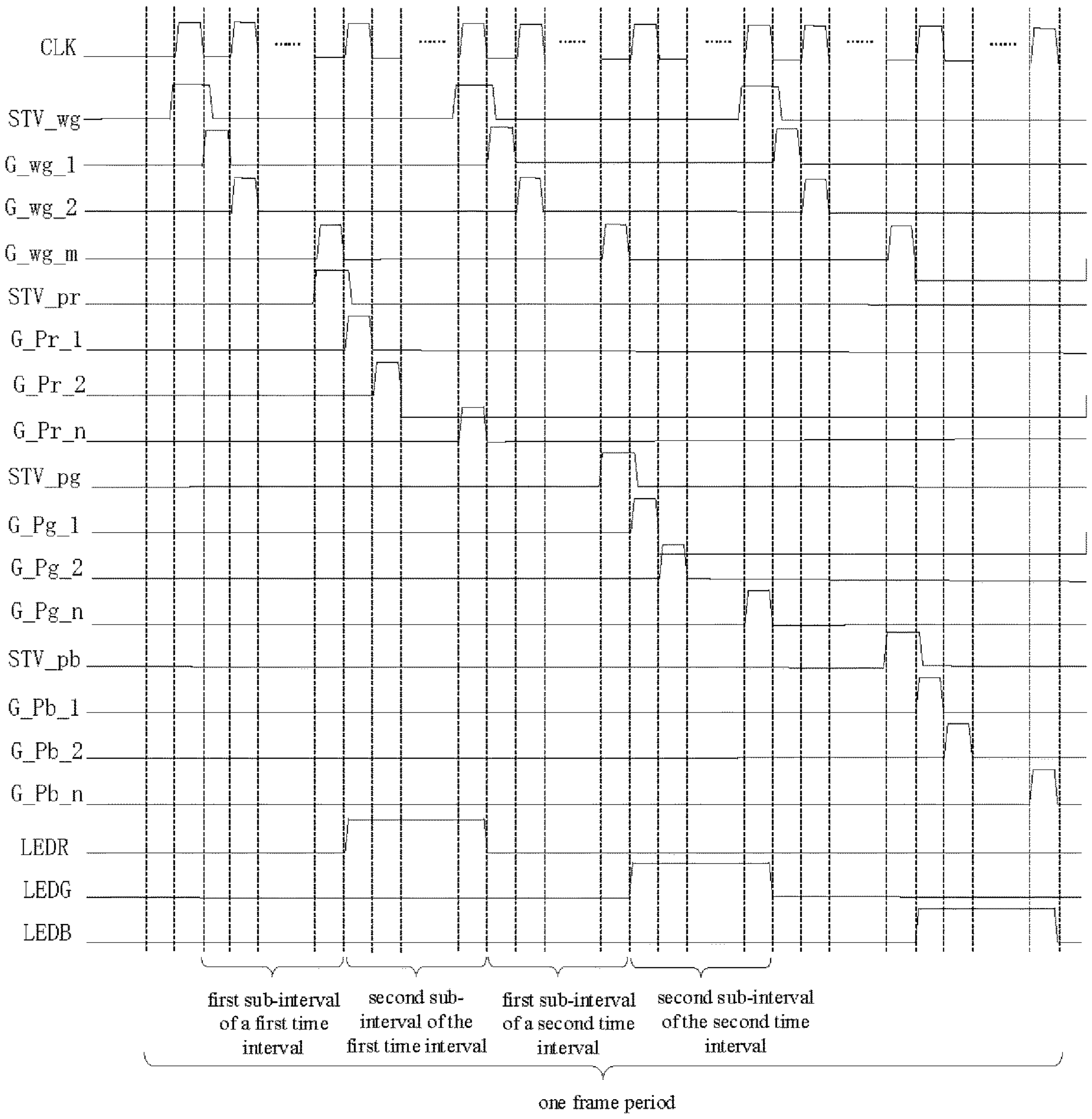
FIG. 4 is a working waveform diagram of a display panel provided by an embodiment of the present disclosure.

In the driving method of the display panel according to this example, an exemplary working process of one frame display is illustrated in the waveform diagram of FIG. 4 and includes the following steps S1 to S6.

S1, the GOA-wg module corresponding to the waveguide display region starts to work, STV_wg sends out a start signal, and the GOA-wg module corresponding to the waveguide display region starts to refresh the R data (that is, scanning signals for driving red sub-pixel units, G_wg_1 to G_wg_m illustrated in FIG. 3) in a line sequence until the last row of the waveguide display region. Simultaneously, the data driving circuit sends the data signal to each red sub-pixel unit in the waveguide display region along the Y data lines.

S2, the first sub-region LCD1 of the liquid crystal display region starts to work, the corresponding GOA-pr module starts to work, STV_pr sends out a start signal, and the LCD1 sub-region starts to refresh the RGB data (that is, scanning signals for driving respective pixel units in the LCD1 sub-region, G_Pr_1 to G_Pr_n illustrated in FIG. 3) in a line sequence until the last row of the LCD1 sub-region. Simultaneously, the data driving circuit sends the data signal to each pixel unit in the LCD1 sub-region along the Y data lines (not shown in FIG. 4). At the same time, during this period of time, the LED_R signal of the waveguide display region is valid, and the R light is turned on during this period of time.

S3, the GOA-wg module corresponding to the waveguide display region starts to work, STV_wg sends a start signal, and the GOA-wg module corresponding to the waveguide display region starts to refresh the G data (that is, scanning signals for driving green sub-pixel units, G_wg_1 to G_wg_m illustrated in FIG. 3) in a line sequence until the last row of the waveguide display region. Simultaneously, the data driving circuit sends the data signal to each green sub-pixel unit in the waveguide display region along the Y data lines.

S4, the second sub-region LCD2 of the liquid crystal display region starts to work, the corresponding GOA-pg module starts to work, STV_pg sends out a start signal, and the LCD2 sub-region starts to refresh the RGB data (that is, scanning signals for driving respective pixel units in the LCD2 sub-region, G_Pg_1 to G_Pg_n illustrated in FIG. 3) in a line sequence until the last row of the LCD2 sub-region. Simultaneously, the data driving circuit sends the data signal to each pixel unit of the LCD2 sub-region along the Y data lines (not shown in FIG. 4). At the same time, during this period of time, the LED_G signal of the waveguide display is valid, and the G light is turned on during this period of time.

S5, the GOA-wg module corresponding to the waveguide display region starts to work, STV_wg sends out the start signal, and the GOA-wg module corresponding to the waveguide display region starts to refresh the B data (that is, scanning signals for driving blue sub-pixel units, G_wg_1 to G_wg_m illustrated in FIG. 3) in a line sequence until the last row of the waveguide display region. Simultaneously, the data driving circuit sends the data signal to each blue sub-pixel unit in the waveguide display region along the Y data lines.

S6, the third sub-region LCD3 of the liquid crystal display region starts to work, the corresponding GOA-pb module starts to work, STV_pb sends out a start signal, and the LCD3 sub-region starts to refresh the RGB (that is, scanning signals for driving respective pixel units in the LCD3 sub-region, G_Pb_1 to G_Pb_n illustrated in FIG. 3) in a line sequence until the last row of the LCD3 sub-region. Simultaneously, the data driving circuit sends the data signal to each pixel unit of the LCD3 sub-region along the Y data lines (not shown in FIG. 4). At the same time, during this period of time, the LED_B signal of the waveguide display is valid, and the B light is turned on during this period of time.

At this point, a one-frame display operation is completed, and repeated operations can realize the normal integrated display of the waveguide and the liquid crystal.

The embodiments of the present disclosure further provide a driving method of the above-mentioned display panel. As described above, the display panel includes the first display region, the second display region, and the control device connected to the first display region and the second display region. The first display region is provided on a side of the second display region, and the second display region includes N display sub-regions. The driving method may include: the control device controlling display of the first display region and display of the second display region in i time intervals within one frame period, respectively, specifically, sequentially controlling the display of the first display region and display of an i-th display sub-region in the second display region in an i-th time interval, where $1 \le i \le N$, and N is a positive integer greater than or equal to 3.

In an exemplary embodiment, the first display region includes a plurality of first pixel units, and the first pixel units are defined by intersection of X1 horizontally arranged first gate lines and Y vertically arranged data lines. The second display region includes a plurality of second pixel units, and the second pixel units are defined by intersection of X2 horizontally arranged second gate lines and Y vertically arranged data lines. The first display region and the second display region share the Y data lines. The first display region is arranged on a side of the second display region along an extending direction of data lines, and the N display sub-regions in the second display region are sequentially arranged along the extending direction of the data lines.

In an exemplary embodiment, the control device includes a row scanning driving circuit and a data driving circuit, and the control device sequentially controlling the display of the first display region and the display of the i-th display sub-region in the i-th time interval includes:

- in the first sub-interval of the i-th time interval within one frame period, the row scanning driving circuit sequentially sending scanning signals to the first gate lines of the first display region, and the data driving circuit outputting data signals to the Y data lines; and
- in the second sub-interval of the i-th time interval within one frame period, the row scanning driving circuit sequentially sending scanning signals to the second gate lines of the i-th display sub-region in the second display region, and the data driving circuit outputting data signals to the Y data lines.

In an exemplary embodiment, the first display region is a waveguide display region, the first display region further includes N light sources, and the light sources are arranged at least on one side of the first display region. The second display region is a liquid crystal display region or an organic light-emitting diode display region. The data driving circuit includes a data driver and a light source driver, and the data driving circuit outputting data signals to the Y data lines includes: in the first sub-interval of the i-th time interval within one frame period, the data driver outputting data signals to the Y data lines; and in the second sub-interval of the i-th time interval within one frame period, the data driver outputting data signals to the Y data lines, and the light source driver outputting a light source turn-on signal to an i-th light source.

In an exemplary embodiment, the row scanning driving circuit includes N+1 row scanning driving sub-circuits, one of the N+1 row scanning driving sub-circuits is connected to X1 first gate lines of the first display region, and each of other row scanning driving sub-circuits is connected to the second gate line of one display sub-region in the second display region.

Based on the same inventive concept, the embodiments of the present disclosure further provide a display device including the display panel described in any one of the foregoing embodiments. The display device provided by the embodiments of the present disclosure may be any product or component with a display function, such as a mobile phone, a tablet computer, a television, a display screen, a notebook computer, a digital photo frame, a navigator, etc.

Referring to the display panel, the display device, and the driving method of the display panel provided by the embodiments of the present disclosure, the row scanning driving circuit drives the waveguide display region and the second display region (for example, the LCD region or OLED display region) in a time-sharing manner, and the data driving circuit drives the waveguide display region and the second display region simultaneously, thereby simplifying the structure of the display panel. In addition, since the display time of the waveguide display region is the same as the driving time of the data line of the second display region, the embodiments of the present disclosure optimize the structure while ensuring that the waveguide display has a longer light-emitting time, thereby improving the display effect.

In the description of the embodiments of the present disclosure, it should be understood that the orientation or positional relationship indicated by the terms “middle”, “upper”, “lower”, “front”, “rear”, “vertical”, “horizontal”, “top”, “bottom”, “inner”, “outer”, etc. is based on the orientation or positional relationship shown in the drawings, and is only for the convenience of describing the present invention and simplifying the description, rather than indicating or implying the concerned device or element must have a specific orientation, be constructed and operated in a specific orientation, and therefore cannot be understood as a limitation of the present invention.

In the description of the embodiments of the present disclosure, it should be noted that the terms “installed”, “connected”, and “connected” should be construed in a broad sense, unless otherwise clearly specified and limited. For example, they may be fixed connections or detachable connection or an integral connection; it can be a mechanical connection or an electrical connection; it can be directly connected or indirectly connected through an intermediate medium, and it can be the internal communication of two components. For those skilled in the art, the specific meanings of the above-mentioned terms in the present invention can be understood according to specific situations.

Although the embodiments disclosed in the present invention are as above, the content described is only the embodiments used for facilitating the understanding of the present invention, and is not intended to limit the present invention. Any person skilled in the art of the present invention can make any modifications and changes in the implementation form and details without departing from the spirit and scope of the present invention. However, the patent protection scope of the present invention is still defined by the appended claims.

The present application claims the priority of Chinese patent application No. 201910454616.9, filed on May 29, 2019, the entire disclosure of which is incorporated herein by reference as part of the disclosure of this application.

What is claimed is:

1. A display panel, comprising a first display region, a second display region, and a control device, wherein the first display region is on a side of the second display region, and the second display region comprises N display sub-regions; and the control device is connected to the first display region and the second display region, respectively, and configured to control display of the first display region and display of the second display region in N time intervals within one frame period sequentially, and to control the display of the first display region and display of an i-th display sub-region in the second display region in an i-th time interval, wherein 1≤i≤N, and N is a positive integer greater than or equal to 3, wherein the first display region comprises a plurality of first pixel units, and the plurality of first pixel units are defined by an intersection of X1 horizontally arranged first gate lines and Y vertically arranged data lines;

the second display region comprises a plurality of second pixel units, and the plurality of second pixel units are defined by an intersection of X2 horizontally arranged second gate lines and the Y vertically arranged data lines;

the first display region is on a side of all of the N display sub-regions of the second display region along an extending direction of the Y vertically arranged data lines, and the N display sub-regions in the second display region are sequentially arranged along the extending direction of the Y vertically arranged data lines, wherein the N display sub-regions of the second display region includes a first display sub-region and a second display sub-region; and wherein X1, X2 and Y are positive integers, and wherein the first display region is a waveguide display region, the first display region further comprises N light sources, and the N light sources are arranged at least on one side of the first display region, wherein the N light sources are overlapped with the plurality of first pixel units of the first display region in an extension direction of the X1 horizontally arranged first gate lines; the second display region is a liquid crystal display region or an organic light-emitting diode display region, wherein the control device being configured to control the display of the first display region and the display of the second display region in the N time intervals within the one frame period, comprises:

in a first sub-interval of a first time interval within the one frame period, sequentially sending scanning signals to the X1 horizontally arranged first gate lines of the first display region to control the display of the first display region;

in a second sub-interval immediately adjacent to the first sub-interval of the first time interval within the one frame period, sequentially sending scanning signals to the X2 horizontally arranged second gate lines of the first display sub-region of the second display region to control the display of the first display sub-region;

in a first sub-interval of a second time interval immediately adjacent to the second sub-interval of the first time interval within the one frame period, sequentially sending scanning signals to the X1 horizontally arranged first gate lines of the first display region to control the display of the first display region; wherein the X1 horizontally arranged first gate lines of the first display region being sent scanning signals in the first sub-interval of the second time interval and the X1 horizontally arranged first gate lines of the first display region being sent scanning signal in the first sub-interval of the first time interval are identical gate lines; and in a second sub-interval immediately adjacent to the first sub-interval of the second time interval within the one frame period, sequentially sending scanning signals to the X2 horizontally arranged second gate lines of the second display sub-region of the second display region to control the display of the second display sub-region, and during the second sub-interval of the second time interval, scanning signals are not sent to the X2 horizontally arranged second gate lines of the first display sub-region of the second display region;

wherein the first display sub-region and the second display sub-region are different display sub-regions of the second display region, and are adjacent to each other without being separated by the waveguide display region, wherein during the second sub-interval of the first time interval and the second sub-interval of the second time interval, scanning signals are sent to different X2 horizontally arranged second gate lines of different display sub-regions of the second display region.

2. The display panel according to claim 1, wherein the first display region and the second display region share the Y vertically arranged data lines.

3. The display panel according to claim 2, wherein the control device comprises a row scanning driving circuit and a data driving circuit, the row scanning driving circuit is connected to the X1 horizontally arranged first gate lines and the X2 horizontally arranged second gate lines, and the data driving circuit is connected to the Y vertically arranged data lines.

4. The display panel according to claim 3, wherein the row scanning driving circuit comprises N+1 row scanning driving sub-circuits, one of the N+1 row scanning driving sub-circuits is connected to the X1 horizontally arranged first gate lines of the first display region, and each of another one of the row scanning driving sub-circuits are connected to the X2 horizontally arranged second gate lines of one display sub-region in the second display region.

5. The display panel according to claim 3, wherein the data driving circuit comprises a data driver and a light source driver, wherein the data driver is connected to the Y vertically arranged data lines, and the light source driver is connected to the N light sources.

6. The display panel according to claim 5, wherein the control device being configured to control the display of the first display region and the display of the first display sub-region in the second display region in the first time interval, further comprises:

in the first sub-interval of the first time interval within the one frame period, outputting data signals to the Y vertically arranged data lines through the data driver; and in the second sub-interval of first time interval within the one frame period, outputting data signals to the Y vertically arranged data lines through the data driver, and outputting a light source turn-on signal to a first light source through the light source driver.

7. A display device, comprising a display panel, wherein the display panel comprises a first display region, a second display region, and a control device;

the first display region is on a side of the second display region, and the second display region comprises N display sub-regions; and the control device is connected to the first display region and the second display region, respectively, and is configured to control display of the first display region and display of the second display region in N time intervals within one frame period sequentially, and to control the display of the first display region and display of an i-th display sub-region in the second display region in an i-th time interval, wherein 1≤i≤N, and N is a positive integer greater than or equal to 3, wherein the first display region comprises a plurality of first pixel units, and the plurality of first pixel units are defined by an intersection of X1 horizontally arranged first gate lines and Y vertically arranged data lines;

the second display region comprises a plurality of second pixel units, and the plurality of second pixel units are defined by an intersection of X2 horizontally arranged second gate lines and the Y vertically arranged data lines;

the first display region is on a side of all of the N display sub-regions in the second display region along an extending direction of the Y vertically arranged data lines, and the N display sub-regions in the second display region are sequentially arranged along the extending direction of the Y vertically arranged data lines, wherein the N display sub-regions of the second display region includes a first display sub-region and a second display sub-region; and wherein X1, X2 and Y are positive integers, and wherein the first display region is a waveguide display region, the first display region further comprises N light sources, and the N light sources are arranged at least on one side of the first display region in an extension direction of the X1 horizontally arranged first gate lines;

the second display region is a liquid crystal display region or an organic light-emitting diode display region, wherein the control device being configured to control the display of the first display region and the display of the second display region in the N time intervals within the one frame period, comprises:

in a first sub-interval of a first time interval within the one frame period, sequentially sending scanning signals to the X1 horizontally arranged first gate lines of the first display region to control the display of the first display region;

in a second sub-interval immediately adjacent to the first sub-interval of the first time interval within the one frame period, sequentially sending scanning signals to the X2 horizontally arranged second gate lines of the first display sub-region of the second display region to control the display of the first display sub-region;

in a first sub-interval of a second time interval immediately adjacent to the second sub-interval of the first time interval within the one frame period, sequentially sending scanning signals to the X1 horizontally arranged first gate lines of the first display region to control the display of the first display region;

wherein the X1 horizontally arranged first gate lines of the first display region being sent scanning signals in the first sub-interval of the second time interval and the X1 horizontally arranged first gate lines of the first display region being sent scanning signal in the first sub-interval of the first time interval are identical gate lines; and in a second sub-interval immediately adjacent to the first sub-interval of the second time interval within the one frame period, sequentially sending scanning signals to the X2 horizontally arranged second gate lines of the second display sub-region of the second display region to control the display of the second display sub-region, and during the second sub-interval of the second time interval, scanning signals are not sent to the X2 horizontally arranged second gate lines of the first display sub-region of the second display region;

wherein the first display sub-region and the second display sub-region are different display sub-regions of the second display region, and are adjacent to each other without being separated by the waveguide display region, wherein during the second sub-interval of the first time interval and the second sub-interval of the second time interval, scanning signals are sent to different X2 horizontally arranged second gate lines of different display sub-regions of the second display region.

8. The display device according to claim 7, wherein the control device comprises a row scanning driving circuit and a data driving circuit; and the control device being configured to sequentially control the display of the first display region and the display of the i-th display sub-region in the second display region in the i-th time interval, comprises:

in a first sub-interval of the i-th time interval within the one frame period, sequentially sending scanning signals to the X1 horizontally arranged first gate lines of the first display region through the row scanning driving circuit, and outputting data signals to the Y vertically arranged data lines through the data driving circuit; and in a second sub-interval of the i-th time interval within the one frame period, sequentially sending scanning signals to the X2 horizontally arranged second gate lines of the i-th display sub-region through the row scanning driving circuit, and outputting data signals to the Y vertically arranged data lines through the data driving circuit.

9. The display device according to claim 8, wherein each of the plurality of first pixel units comprises sub-pixel units of N colors;

each of the plurality of second pixel units comprises sub-pixel units of the N colors; and the control device being configured to sequentially control the display of the first display region and the display of the i-th display sub-region in the second display region in the i-th time interval, comprises:

in the first sub-interval of the i-th time interval within the one frame period, sequentially sending scanning signals for driving an i-th color of the plurality of first pixel units to the X1 horizontally arranged first gate lines of the first display region through the row scanning driving circuit, and outputting data signals of the i-th color of the plurality of first pixel units to the Y vertically arranged data lines through the data driving circuit; and in the second sub-interval of the i-th time interval within the one frame period, sequentially sending scanning signals for driving the N colors of the plurality of second pixel units in the i-th display sub-region to the X2 horizontally arranged second gate lines of the i-th display sub-region through the row scanning driving circuit, and outputting data signals of the N colors of the plurality of second pixel units to the Y vertically arranged data lines through the data driving circuit.

10. The display device according to claim 8, wherein the data driving circuit comprises a data driver and a light source driver, and the data driving circuit being configured to output data signals to the Y vertically arranged data lines, comprises:

in a first sub-interval of the i-th time interval within the one frame period, outputting data signals to the Y vertically arranged data lines through the data driver; and in a second sub-interval of the i-th time interval within the one frame period, outputting data signals to the Y vertically arranged data lines through the data driver, and outputting a light source turn-on signal to an i-th light source through the light source driver.

11. The display device according to claim 8, wherein the row scanning driving circuit comprises N+1 row scanning driving sub-circuits, one of the N+1 row scanning driving sub-circuits is connected to the X1 horizontally arranged first gate lines of the first display region, and each of another one of the row scanning driving sub-circuits is connected to the X2 horizontally arranged second gate lines of one display sub-region in the second display region.

12. A driving method of a display panel, wherein the display panel comprises a first display region, a second display region, and a control device;

the first display region is on a side of the second display region, the second display region comprises N display sub-regions, the control device is connected to the first display region and the second display region, respectively, and N is a positive integer greater than or equal to 3, the first display region comprises a plurality of first pixel units, and the plurality of first pixel units are defined by an intersection of X1 horizontally arranged first gate lines and Y vertically arranged data lines;

the second display region comprises a plurality of second pixel units, and the plurality of second pixel units are defined by an intersection of X2 horizontally arranged second gate lines and the Y vertically arranged data lines;

the first display region is on a side of all of the N display sub-regions of the second display region along an extending direction of the Y vertically arranged data lines, and the N display sub-regions in the second display region are sequentially arranged along the extending direction of the Y vertically arranged data lines, wherein the N display sub-regions of the second display region includes a first display sub-region and a second display sub-region; and wherein X1, X2 and Y are positive integers; and the first display region is a waveguide display region, the first display region further comprises N light sources, and the N light sources are arranged at least on one side of the first display region in an extension direction of the X1 horizontally arranged first gate lines;

the second display region is a liquid crystal display region or an organic light-emitting diode display region, the driving method comprises:

controlling display of the first display region and display of the second display region in N time intervals within one frame period, respectively, and controlling the display of the first display region and display of an i-th display sub-region in the second display region in an i-th time interval, wherein $1 \le i \le N$, wherein controlling the display of the first display region and the display of the second display region in the N time intervals within the one frame period, comprises:

in a first sub-interval of a first time interval within the one frame period, sequentially sending scanning signals to the X1 horizontally arranged first gate lines of the first display region to control the display of the first display region;

in a second sub-interval immediately adjacent to the first sub-interval of the first time interval within the one frame period, sequentially sending scanning signals to the X2 horizontally arranged second gate lines of the first display sub-region of the second display region to control the display of the first display sub-region;

in a first sub-interval of a second time interval immediately adjacent to the second sub-interval of the first time interval within the one frame period, sequentially sending scanning signals to the X1 horizontally arranged first gate lines of the first display region to control the display of the first display region; wherein the X1 horizontally arranged first gate lines of the first display region being sent scanning signals in the first sub-interval of the second time interval and the X1 horizontally arranged first gate lines of the first display region being sent scanning signal in the first sub-interval of the first time interval are identical gate lines; and in a second sub-interval immediately adjacent to the first sub-interval of the second time interval within the one frame period, sequentially sending scanning signals to the X2 horizontally arranged second gate lines of the second display sub-region of the second display region to control the display of the second display sub-region, and during the second sub-interval of the second time interval, scanning signals are not sent to the X2 horizontally arranged second gate lines of the first display sub-region of the second display region;

wherein the first display sub-region and the second display sub-region are different display sub-regions of the second display region, and are adjacent to each other without being separated by the waveguide display region, wherein during the second sub-interval of the first time interval and the second sub-interval of the second time interval, scanning signals are sent to different X2 horizontally arranged second gate lines of different display sub-regions of the second display region.

13. The driving method according to claim 12, wherein the first display region and the second display region share the Y vertically arranged data lines in the display panel, in the driving method, sequentially controlling the display of the first display region and the display of the i-th display sub-region in the second display region in the i-th time interval, comprises:

in a first sub-interval of the i-th time interval within the one frame period, sequentially sending scanning signals to the X1 horizontally arranged first gate lines of the first display region, and outputting data signals to the Y vertically arranged data lines; and in a second sub-interval of the i-th time interval within the one frame period, sequentially sending scanning signals to the X2 horizontally arranged second gate lines of the i-th display sub-region in the second display region, and outputting data signals to the Y vertically arranged data lines.

14. The driving method according to claim 13, wherein each of the plurality of first pixel units comprises sub-pixel units of N colors; each of the plurality of second pixel units comprises sub-pixel units of the N colors, in the driving method, sequentially controlling the display of the first display region and the display of the i-th display sub-region in the second display region in the i-th time interval, comprises:

in the first sub-interval of the i-th time interval within the one frame period, sequentially sending scanning signals for driving an i-th color of the plurality of first pixel units, and outputting data signals of the i-th color of the plurality of first pixel units to the Y vertically arranged data lines, and in the second sub-interval of the i-th time interval within the one frame period, sequentially sending scanning signals for driving the N colors of the plurality of second pixel units in the i-th display sub-region to the X2 horizontally arranged second gate lines of the i-th display sub-region in the second display region, and outputting data signals of the N colors of the plurality of second pixel units to the Y vertically arranged data lines.

15. The driving method according to claim 13, further comprising:

in the first sub-interval of the i-th time interval within the one frame period, outputting data signals to the Y vertically arranged data lines; and in the second sub-interval of the i-th time interval within the one frame period, outputting data signals to the Y vertically arranged data lines, and outputting a light source turn-on signal to an i-th light source in the first display region.

* * * * *